(12) United States Patent
Yamamoto

(10) Patent No.: US 7,347,626 B2
(45) Date of Patent: Mar. 25, 2008

(54) SHAFT BEARING RETAINER

(75) Inventor: Takuya Yamamoto, Nagano-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 11/642,799

(22) Filed: Dec. 20, 2006

(65) Prior Publication Data

US 2007/0098313 A1 May 3, 2007

Related U.S. Application Data

(62) Division of application No. 10/689,934, filed on Oct. 21, 2003, now Pat. No. 7,198,408.

(30) Foreign Application Priority Data

Nov. 1, 2002 (JP) ............................. 2002-319668

(51) Int. Cl.
 *F16C 33/38* (2006.01)
(52) U.S. Cl. ........................... 384/531; 384/523
(58) Field of Classification Search ............... 384/470, 384/523, 531, 532, 536
See application file for complete search history.

(56) References Cited

U.S. PATENT DOCUMENTS

| 4,941,759 A | 7/1990 | Dreschmann et al. |
| 5,137,376 A | 8/1992 | Gutsche et al. |
| 6,406,189 B1 | 6/2002 | Boutreux et al. |
| 6,416,230 B1 | 7/2002 | Staudigel et al. |

FOREIGN PATENT DOCUMENTS

| EP | 0 644 344 A1 | 3/1995 |
| FR | 993 520 A | 11/1951 |
| JP | 61215811 A | 9/1986 |
| JP | 08277843 A | 10/1996 |
| JP | 2001-165172 | 6/2001 |
| WO | WO 99/56029 | 11/1999 |

*Primary Examiner*—William C. Joyce
(74) *Attorney, Agent, or Firm*—Townsend and Townsend and Crew LLP

(57) ABSTRACT

A retainer for holding bearings within a shaft bearing has C-shaped pockets for holding the bearings. Between the pockets are connecting portions, which are close to the openings of the pockets. The rear sides of adjacent pockets and the rear side of the connecting portion for the adjacent pockets form a concave site that is deeply gouged into the retainer. The bottom of the concave site is closer to the openings than the bottom of the pockets, thereby allowing base oil from grease in the concave site to better migrate onto the bearings and so lubricate the shaft bearing.

14 Claims, 2 Drawing Sheets

SHAFT BEARING RETAINER

CROSS-REFERENCE TO RELATED APPLICATIONS

This application is a divisional application of and claims all rights of priority to U.S. patent application Ser. No. 10/689,934, filed Oct. 21, 2003 now U.S. Pat. No. 7,198,408, which claims all rights of priority to Japanese Patent Application Serial Number 2002-319668, filed Nov. 1, 2002.

FIELD OF THE INVENTION

The present invention relates to shaft bearings that include bearings. More particularly, the present invention relates to retainers for holding the bearings in the shaft bearing.

BACKGROUND OF THE INVENTION

Shaft bearings are used to constrain a rotating shaft to maintain its axis of rotation. Such shaft bearings are used in motors, such as spindle motors, commonly found in computer equipment and audio systems. A typical structure for a shaft bearing includes two rings, bearings, and a retainer. The two rings are an inner ring, having a rotation groove on its outer surface, and an outer ring, having a corresponding rotation groove on its inner surface. The grooves and the axis of rotation are common to the rings. Between the two rotation grooves are a plurality of bearings, sometimes called ball bearings, which are evenly spaced apart circumferentially. The retainer is between the inner and outer rings and maintains even spacing of the bearings around the circumference of the rings. In this manner, the inner ring rotates with respect to the outer ring along a common axis by means of the evenly spaced apart bearings between the rotation grooves.

One type of retainer is a crown retainer. A crown retainer is typically molded from resin into a ring shape and includes a plurality of pockets equidistantly spaced around the circumference of the retainer. Each pocket retains a corresponding bearing to maintain the even spacing of the bearings around the rotation grooves. The pockets are open on one side of the retainer along the axial direction of the retainer. The inner surface of each pocket has a curvature corresponding to the curvature of the bearing.

The shaft bearing is assembled by inserting the bearings between the respective rotation grooves of the outer and inner rings, and inserting the retainer between the rings to snap each bearing into its corresponding pocket on the retainer. Upon mounting the retainer, grease is inserted into the shaft bearing, and a shield is mounted on the shaft bearing to close the gap between the inner and outer rings.

The grease is inserted onto the retainer between the inner and outer rings. The grease is inserted from the side of the retainer that has the pocket openings, and it is inserted onto the edge faces of the retainer between the pockets, where it adheres. A component of the grease is a low viscosity lubricating oil, called base oil, which soaks through from the grease and flows into the pockets as the retainer revolves around the axis of rotation. Since the bearings rotate in the retainer, the base oil in the interior of the pockets migrates between the rotation grooves of the inner and outer rings. In this manner, the base oil lubricates the rotation faces of the bearings in contact with the rotation grooves.

Some shaft bearings, however, do not allow insertion of the grease from the side of the retainer having the pocket opening. Examples of such shaft bearings have multiple coaxial rows of bearings. One such example is a shaft bearing having two coaxial rows of bearings between the inner and outer rings. Each row of bearings has a respective retainer that is inserted between the rings to snap the two rows of bearings into place. But the pocket openings of the two retainers face each other in this assembly. Access to the retainers is only to the respective sides of the retainers that are opposite to the pocket openings. As such, the grease is not near the pockets as they move around the circumference of the grooves, and it takes a relatively long time for sufficient base oil to reach the surface of the bearings.

In this case, the lack of sufficient lubrication reduces the life span of the shaft bearing or renders the shaft bearing immediately unusable. Moreover, the grease immediately scatters when the shaft begins to rotate and adheres to the outer ring and shield. Achieving a stable rotation with low torque is therefore difficult.

One proposed solution is to include channels between the pockets on the outer circumference of the retainer. Each channel runs between the edge faces of the retainer. Either the channel holds the grease or the grease is inserted through the channel to the pocket opening side of the retainer. Even so, it is difficult to align the nozzle of a grease gun with each channel, and the grease would adhere to the inner surface of the outer ring and not sufficiently utilize the channel.

A further proposed solution to the problems associated with the channels in the retainer is to form a relatively elongated nozzle access area that leads to each channel on the edge face opposite the pocket opening. Such a nozzle access area is described in Japanese Patent Publication No. JP 8-277843. The ejection opening of the nozzle may be easily positioned with respect to this relatively long nozzle access area, in contrast to the difficulty of positioning the nozzle with respect to the channels as described above. The easy positioning allows for the adequate insertion of grease.

Since grease is inserted from the nozzle access area up to the channel, however, this solution is inefficient because not all of the grease is used. Also, flow resistance of the grease is generated as the route traveled by the inserted grease lengthens, and the channel may still not receive sufficient grease.

SUMMARY

A retainer for a shaft bearing is described below to address the need for a retainer that allows base oil to reach pocket openings on the retainer, where the base oil is from grease that is applied to the edge face of the retainer opposite the pocket openings.

One aspect of the shaft bearing retainer includes at least two pocket rings. Each pocket ring has a circumferential outer surface and an opening. The shaft bearing retainer also includes at least one connecting portion disposed between the two pocket rings. The connecting portion is located in close proximity to the openings of the pocket rings, and the connecting portion and circumferential outer surfaces of the pocket rings form a concave site.

Another aspect of the invention is a shaft bearing. The shaft bearing includes a retainer which has at least two pocket rings. Each pocket ring has a circumferential outer surface and an opening. The retainer also includes at least one connecting portion disposed between the two pocket rings. The connecting portion is located in close proximity to the openings of the pocket rings, and the connecting portion and circumferential outer surfaces of the pocket rings form a concave site.

The foregoing and other features and advantages of preferred embodiments will be more readily apparent from the following detailed description, which proceeds with reference to the accompanying drawings.

DETAILED DESCRIPTION OF THE PREFERRED EMBODIMENTS

Figure 1:
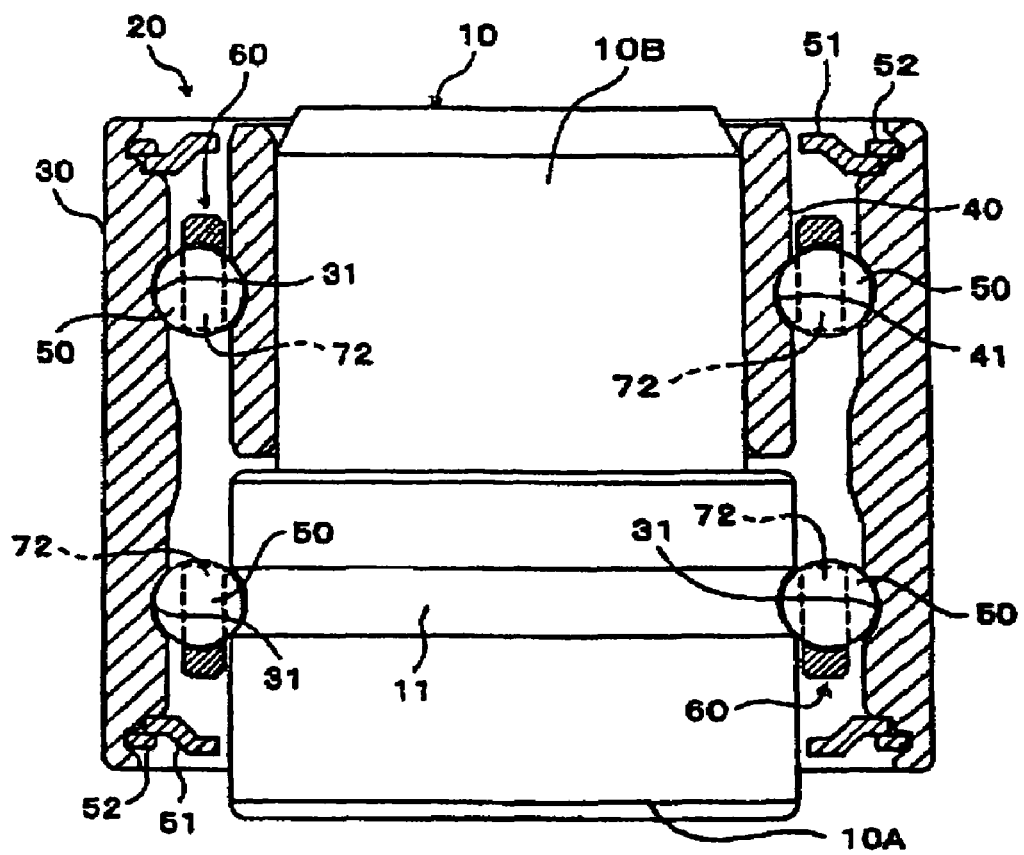
FIG. 1 is a longitudinal cross-sectional view illustrating a shaft bearing containing a retainer.

FIG. 1 shows a longitudinal cross section of a shaft bearing 20 that includes a shaft 10, which rotates. The shaft bearing 20 includes an outer ring 30, an inner ring 40, two rows of rolling elements such as bearings 50, and a ring-shaped retainer 60 that holds the bearings 50 in each row. The shaft 10 has a stepped shape, having a large diameter portion 10A and a small diameter portion 10B that are coaxial to each other. The outer circumferential face of the large diameter portion 10A has a rotation groove 11 along the direction of the circumference. The outer circumferential face of the small diameter portion 10B, has an inner ring 40 affixed by means such as adhesive. The external diameter of the inner ring 40 equals the external diameter of the large diameter portion 10A of the shaft 10. The outer circumferential face of the inner ring 40 has a rotation groove 41 along the direction of the circumference. The inner circumference face of the outer ring 30 has two rows of rotation grooves 31 formed along the direction of the circumference.

Between each rotation groove 31 of the outer ring 30 and the respective rotation grooves 11, 41 of the shaft 10 and the inner ring 40, is a prescribed number of bearings 50, which are held at equal intervals in the direction of the circumference. The bearings 50 are snapped into the retainers 60 and roll freely. Shields 51 close the spacing of both end portions of the shaft bearing 20 after grease is inserted into each retainer. The shields 51 are mounted on the inner circumferential face of the outer ring 30 by snap rings 52. In this shaft bearing 20, the large diameter portion 10A of the shaft 10 is constrained by the outer ring 30 by means of bearings 50 and rotates freely. The small diameter portion 10B is constrained by the outer ring 30 by means of the inner ring 40 and the bearings 50.

The shaft bearing 20 is assembled in the following manner. The inner ring 40 is snapped into the small diameter portion 10B of the shaft 10. The shaft 10 is inserted into the outer ring 30 and the prescribed number of bearings 50 are snapped in between the respective rotation grooves 11 and 41 of the shaft 10 and the inner ring 40. The retainer 60 is snapped onto the bearings 50, and the inner ring 40 is adhered to the shaft 10. After assembly, the shield 51 is mounted with the snap ring 52.

Figure 2:
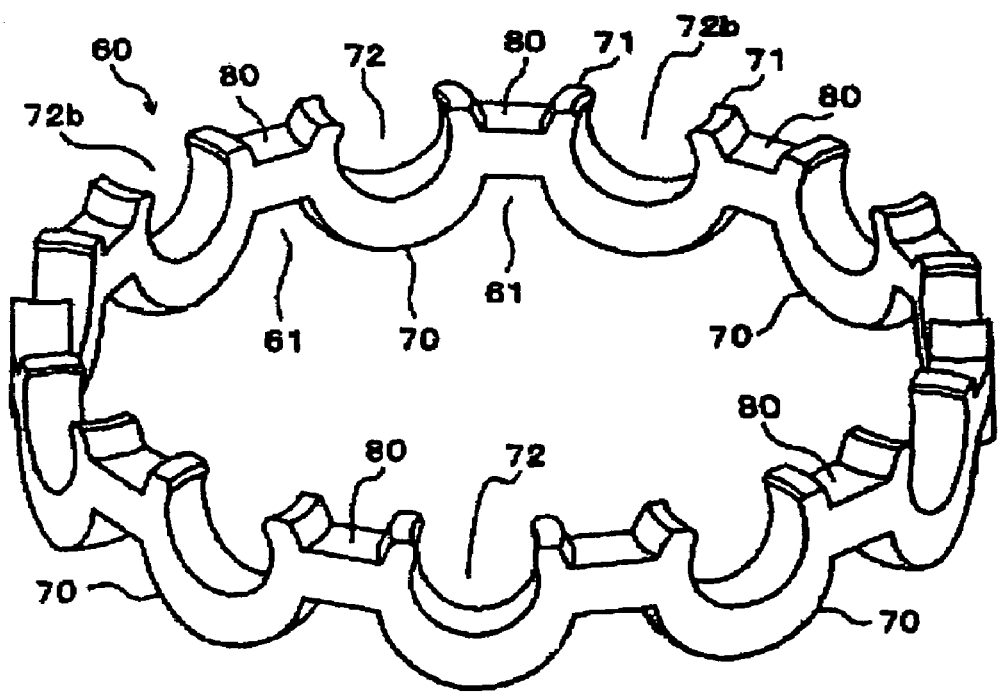
FIG. 2 is an overall perspective view of a preferred embedment of the retainer of FIG. 1.

FIG. 2 is an overall perspective view of the retainer 60 in the shaft bearing 20 of FIG. 1. The retainer is a crown type composed of resin or other such deformable elastomeric material. It should be understood, however, that the present invention is not restricted to resin and that other deformable elastomeric material may be used such as polypropylene, rubber, or polyethylene. The retainer 60 includes a plurality of pocket rings 70 disposed at equal intervals along the direction of the circumference of the retainer 60. Connecting portions 80 are disposed between these pocket rings 70, connecting the pocket rings.

The pocket ring 70 is C-shaped. The inner portion of the pocket ring 70 is formed by the pocket 72, into which the bearings 50 are snapped. An opening 72b of the pocket 72 is open on one of the sides of the pocket 72 in the direction along the axial direction of the shaft retainer 60. The opening 72b of the pocket 72 is the space between both edges of-the pocket rings 70. The pocket ring 70 includes a pair of nail portions 71 which may deform elastically on either side of the pocket opening 72b in preference to deformation of the connecting portion 80. The pocket opening 72b is the space between the nail portions 71. The internal face of the pocket 72 has a curved surface corresponding the surface of the bearing 50 that is snapped into the retainer 60. The bearings 50 are inserted into the retainer 60 by placing the bearing 50 in contact with the tips of the nail portions 71. Each nail portion 71 elastically deforms and widens to accept the bearing 50. By further insertion, the bearing 50 snaps into the pocket 72. In this manner, each bearing 50 is held at equal intervals along the circumference of the retainer 60.

Figure 3:
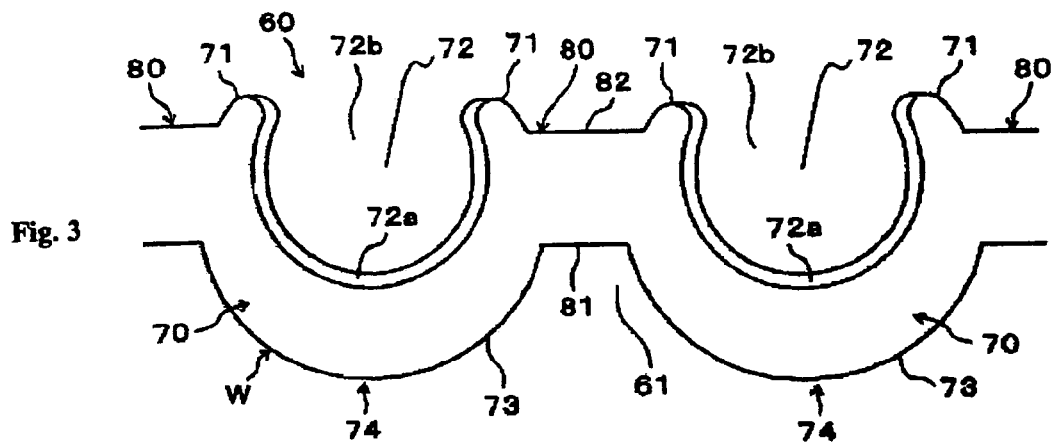
FIG. 3 is a partial magnified side view of a preferred embodiment of the retainer of FIG. 1.

FIG. 3 is a partial magnified side view of a preferred embodiment of the retainer 60. The rear face side of the retainer 60 is defined as the side opposite to those of the pocket openings 72b. On the rear face side are concave sites 61, formed between adjacent pocket rings 70. Each concave site 61 is defined by the arc-shaped outer circumferential faces 73 of adjacent pocket rings 70 and an edge face 81 of the rear face side of the connecting portion 80. The bottom of the concave site 61 is the edge face 81, which is closer to the pocket opening 72b than the bottom portion 72a of the pocket 72 is to the pocket opening 72b. Further, the thickness of the pocket ring 70 decreases on moving around the pocket 70 from the bottom portion 72a to the nail portion 71.

Each of the two rows of bearings 50 is mounted with a respective retainer 60. The bearings 50 are snapped in between each rotation groove 31 of the outer ring 30 and the respective rotation grooves 11, 41 of the shaft 10 and the inner ring 40. As shown in FIG. 1, each retainer 60 is oriented such that the pocket openings 72b of each retainer 60 are opposed to each other. After mounting each retainer 60, grease is inserted into each concave site 61 from the rear face side of the retainer 60.

Edge face 81 of connecting portion 80 forms the bottom of the concave site 61 on the rear face side of the retainer 60. This edge face 81 is nearer the pocket opening 72b than the bottom portion 72a of the pocket 72 is to the pocket opening 72b, as shown in FIG. 3. In other words, the-concave sites 61 are deeply scooped out of the rear-face side of the retainer 60. Further, because the thickness of the pocket rings 70 decreases going around the pocket ring 70 from the bottom portion 72a, through the connecting portion 80, to the nail portion 71, the circumferential length 73 of the concave site 61 may be increased as compared to the length for a uniformly thick pocket ring 70.

With this configuration, a relatively large quantity of grease may be inserted into and held in the concave site 61. As the retainer 60 revolves around the shaft 10, the pocket 72 may receive adequate base oil from the grease at the bottom of the concave site 61, i.e. edge face 81, to lubricate the bearings 50 because the edge face 81 is nearer to the pocket opening 72b as described above. Moreover, the grease inserted into the concave site 61 does not easily adhere to the outer ring 30, the inner ring 40, the shaft 10, and the shield 51. Thus base oil may lubricate the bearings 50 immediately upon the rotation of the shaft 10, increasing the life span of the shaft bearing 20 and permitting the rotation with low torque.

Figure 4:
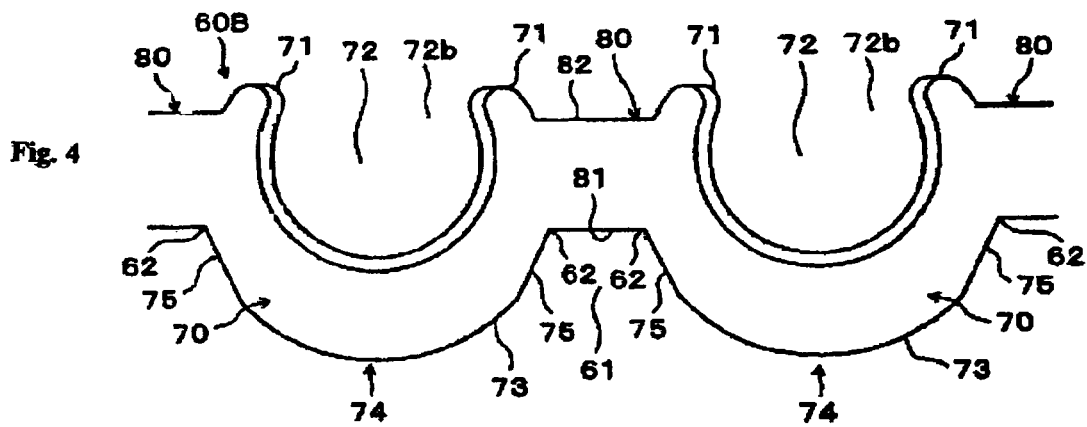
FIG. 4 is a partial magnified side view of another preferred embodiment of the retainer of FIG. 1.

FIG. 4 is a partial magnified side view of another preferred embodiment of the retainer 60B. The retainer 60B includes planes 75 formed on the edge portions of the outer circumferential face 73 of the pocket ring 70 that forms the concave site 61, towards the center 74 of the pocket ring 70. This embodiment of the retainer 60B may be manufactured by injection molding of resin into metal molds. If the two metal molds separate axially, i.e. separate axially along a circumferential line, the molds may be simplified by matching the parting line of the molds with the edge face 81, or having the parting line of the molds cross the planes 75. Further, the pouring gate of the mold may be set on the edge face 81 on the rear face side of the retainer 60B.

Figure 5:
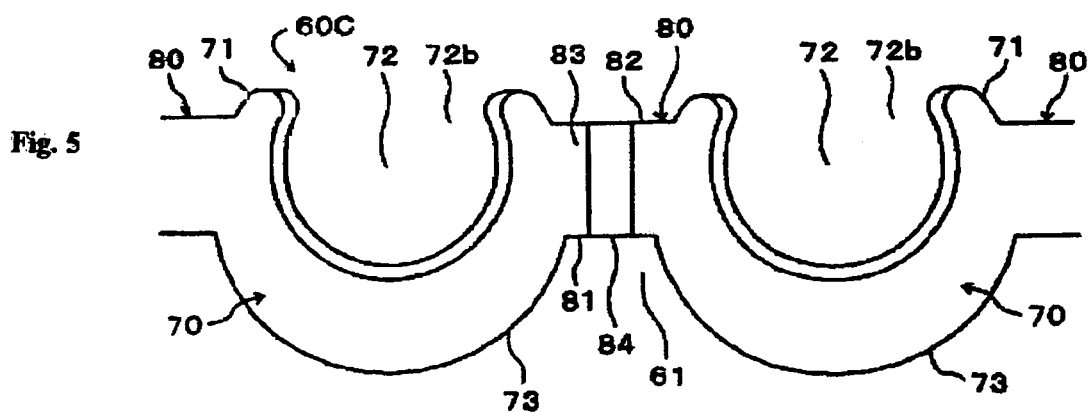
FIG. 5 is a partial magnified view of yet another preferred embodiment of the retainer of FIG. 1.

FIG. 5 is a partial magnified side view of yet another preferred embodiment of the retainer of 60C. The retainer 60C includes a channel 84 between the edge faces 81, 82 of the connecting portion 80. The channel 84 is formed on the outer circumferential face 83 of the connecting portion 80. Grease is inserted into the concave site 61 and is held in the channel 84. The channel 84 supplies base oil to the interior of the pocket 72, improving lubrication of the bearing 50 that is snapped into the pocket 72.

In general, the present invention permits the introduction of large quantities of grease onto the rear face side of the retainer 60-60C, opposite the pocket opening 72b side of the retainer 60-60C, for lubricating the bearings 50 and rotation grooves of the shaft bearing 20. It should be understood, however, that the present invention is not limited to the embodiments described above and that other configurations of the concave site 61 are possible for holding grease in close proximity to the pocket opening 72b, such as closer to the pocket opening 72b than the bottom portion 72a of the pocket 72.

The foregoing detailed description is merely illustrative of several physical embodiments of the invention. Physical variations of the invention, not fully described in the specification, may be encompassed within the purview of the claims. Accordingly, any narrower description of the elements in the specification should be used for general guidance, rather than to unduly restrict any broader descriptions of the elements in the following claims.

What is claimed is:

1. A shaft bearing retainer comprising:
   at least two pocket rings, each ring having a circumferential outer surface, an opening, two nail portions located immediately adjacently to the opening, and a rear portion located opposite the opening; and
   at least one connecting portion disposed between adjacent nail portions of the two pocket rings,
   wherein the connecting portion and circumferential outer surfaces of the pocket rings form a concave site, wherein the connecting portion further comprises an upper edge, a bottom edge and a channel, wherein the channel extends from the upper edge to the bottom edge, and wherein the thickness of each pocket ring gradually decreases such that the thickness of each pocket ring in a middle section of the rear portion is greater than the thickness of the rear portion in sections adjacent the connecting portion.

2. The shaft bearing retainer of claim 1, wherein each of the pocket rings further comprises an inner surface having a shape complementary to the shape of a rolling element of the shaft bearing.

3. The shaft bearing retainer of claim 1, wherein a bottom of the concave site is positioned closer to the openings of the pocket rings than bottom portions of the pocket rings are to the openings of the pocket rings.

4. The shaft bearing retainer of claim 1, wherein the concave site is configured to accommodate lubricating material.

5. The shaft bearing retainer of claim 1, wherein each nail portion is deformable towards the opening of the pocket ring.

6. The shaft bearing retainer of claim 1, wherein the retainer is composed of a deformable elastomeric material.

7. The shaft bearing retainer of claim 6, wherein the elastomeric material is resin.

8. A shaft bearing having a retainer, wherein the retainer comprises:
   at least two pocket rings, each ring having a circumferential outer surface, an opening, two nail portions located immediately adjacently to the opening, and a rear portion located opposite the opening; and
   at least one connecting portion disposed between adjacent nail portions of the two pocket rings,
   wherein the connecting portion and circumferential outer surfaces of the pocket rings form a concave site, wherein the connecting portion further comprises an upper edge, a bottom edge and a channel, wherein the channel extends from the upper edge to the bottom edge, and wherein the thickness of each pocket ring gradually decreases such that the thickness of each pocket ring in a middle section of the rear portion is greater than the thickness of the rear portion in sections adjacent the connecting portion.

9. The shaft bearing of claim 8, wherein each of the pocket rings further comprises an inner surface having a shape complementary to the shape of a rolling element of the shaft bearing.

10. The shaft bearing of claim 8, wherein a bottom of the concave site is positioned closer to the openings of the pocket rings than bottom portions of the pocket rings are to the openings of the pocket rings.

11. The shaft bearing of claim 8, wherein the concave site is configured to accommodate lubricating material.

12. The shaft bearing of claim 8, wherein each nail portion is deformable towards the opening of the pocket ring.

13. The shaft bearing of claim 8, wherein the retainer is composed of a deformable elastomeric material.

14. The shaft bearing of claim 13, wherein the elastomeric material is resin.

* * * * *